United States Patent [19]

Koko et al.

[11] Patent Number: 5,434,791
[45] Date of Patent: Jul. 18, 1995

[54] PRODUCT STRUCTURE MANAGEMENT

[75] Inventors: Boma R. Koko, Westminster, Calif.; Hugh Stewart, Cambridge, England

[73] Assignee: Electronic Data Systems Corporation, Plano, Tex.

[21] Appl. No.: 84,376

[22] Filed: Jun. 29, 1993

[51] Int. Cl.$^6$ .............................................. G05B 19/18
[52] U.S. Cl. .................... 364/468; 364/401; 395/600
[58] Field of Search ........... 364/401, 402, 403, 474.24, 364/468, 406, 512, 188-193; 395/919, 600, 133; 235/385

[56] References Cited

U.S. PATENT DOCUMENTS

| | | | |
|---|---|---|---|
| 4,847,761 | 7/1989 | Ferriter et al. | 364/401 |
| 4,862,376 | 8/1989 | Ferriter et al. | 364/468 |
| 4,870,591 | 9/1989 | Cicciarelli et al. | 364/468 |
| 4,887,206 | 12/1989 | Natarajan | 364/401 |
| 5,109,337 | 4/1992 | Ferriter et al. | 364/401 |
| 5,119,307 | 6/1992 | Blaha et al. | 364/468 |
| 5,191,534 | 3/1993 | Orr et al. | 364/468 |
| 5,197,001 | 3/1993 | Mukherjee | 364/403 |
| 5,210,686 | 5/1993 | Jernigan | 364/403 |
| 5,260,883 | 11/1993 | Wilson | 395/919 |
| 5,295,067 | 3/1994 | Cho et al. | 364/401 |
| 5,307,261 | 4/1994 | Maki et al. | 364/401 |
| 5,311,424 | 5/1994 | Mukherjee et al. | 364/401 |
| 5,317,729 | 5/1994 | Mukherjee | 395/600 |

FOREIGN PATENT DOCUMENTS 91480158 10/1991 European Pat. Off. .
92480077 6/1992 European Pat. Off. .

OTHER PUBLICATIONS

Chung, et al., "Illustration of Object-Oriented Databases for the Structure of a Bill of Materials," Computers in Industry, vol. 19, No. 3, Jun. 1992, pp. 257-270.

Primary Examiner—James P. Trammell
Attorney, Agent, or Firm—L. Joy Griebenow

[57] ABSTRACT

An object-oriented method of using a computer to store a model of an imprecise structure of a product. The product's components are modeled as items and item revisions. Each item and item revision has a view, which may have view revisions. The method links view objects and view revision objects with occurrence references to each other and to view objects and view revision objects of other components. Context-specific view revisions are modeled as appearances. A user's request for a display of a product is received and used to invoke configuration rules that determine which view revisions) are part of the product. The correct view revisions are assembled with their occurrences and appearances.

23 Claims, 3 Drawing Sheets

| BILL OF MATERIALS: 456330C BICYCLE | | | | | |
|---|---|---|---|---|---|
| FILE | DISPLAY | EDIT | FIND | CONTROL | HELP |

| ITEM ID    DESCRIPTION | SEQUENCE | QTY | BOM NOTE |
|---|---|---|---|
| +456330C BICYCLE | | | |
|   +456285B FRAME ASSEMBLY – COMPLETE | 10 | 1 | |
|     +835669D FRAME ASSEMBLY – WELDMENT | 10 | 1 | |
|       −998350E BEARING – STEM | 20 | 2 | |
|       +835668B FRONT FORK ASSEMBLY – WELDMENT | 30 | 1 | |
|         −395769C FORK | 10 | 1 | |
|         −395770B FLANGE – FRONT | 20 | 2 | |
|         −395771A STEM TUBE | 30 | 1 | |
|     −998355F BEARING – CRANK | 40 | 1 | YES |
|     −555128D CRANK | 50 | 1 | |
|     −555132G SPROCKET, LARGE | 60 | 1 | |
|     +835667B HANDLEBAR AND STEM ASSEMBLY | 70 | 1 | YES |
|     −998344A BOLT | 80 | 1 | YES |
|     −555124D EXPANSION NUT | 90 | 1 | |
|   +456286D FRONT WHEEL ASSEMBLY | 20 | 1 | |
|   +456871F REAR WHEEL ASSEMBLY | 30 | 1 | |

*FIG. 3*

| STRUCTURE EDITOR | | | | | | | |
|---|---|---|---|---|---|---|---|
| ITEM ID | IR-ID | VIEW | V-DESC | O-DESC | APPEARANCE | A-DESC | STATUS |
| EX-125 | | | DELUXE | | | | |
|   AX-025 | A | AX-025 | | | | | |
|     WH-56-1 | | | TUBE-LESS | | Y | LFW | |
|     WH-56-1 | | | | | | | |
|   AX-025-1 | | | | | | | |
|     WH-56-1 | | | | | | | |
|     WH-56-1 | | | | | | | |

*FIG. 4*

PRODUCT STRUCTURE MANAGEMENT

TECHNICAL FIELD OF THE INVENTION

This invention relates to computer-aided product design, and more particularly to a method for managing the structure of a product during design and manufacturing processes.

BACKGROUND OF THE INVENTION

"Product data management" (PDM) is a term used to describe computer-based methods for managing product design and manufacture. An example of a PDM system is the Information Manager system, sold by Electronics Data Systems Corporation. The design of the Information Manager system is based on the objects it manipulates. A primary focus of the system is on representing the enterprise in terms of its objects and operations on them. Object classes are derived by modeling enterprise operations such as design, manufacture, administration, project management, and cost control.

Computer-aided design and computer-aided manufacturing (CAD/CAM) systems are another type of computer-based manufacturing aid. They are generally used by design engineers to model precise geometries of product designs and revisions.

Both PDM and CAD/CAM are helpful in today's product design and manufacturing environment. However, existing CAD/CAM systems and PDM systems do not effectively reconcile the needs of different types of potential users who are involved in product design and manufacture. A first type of user, such as a design engineer, is interested in precise configurations of a product, as well as accounting for revision alternatives. A second type of user, such as a manufacturing engineer, deals with imprecise configurations in general terms that may include different revisions of the same product. For example, a manufacturing engineer might wish to refer to a basic product whose components change according to certain dates or serial numbers.

A need exists for a computer-based manufacturing aid that will satisfy the needs of both types of users.

SUMMARY OF THE INVENTION

A computer-based product structure management (PSM) system stores data representing an imprecise structure of a product and presents data representing a precise structure of that product. The PSM stores a description of each component of the product as an object of a view data class. It also stores a description of a revision to a component as an object of a view revision data class. It links view objects and view revision objects with occurrence references to each other and to view objects and view revision objects of other components. During its run-time operation, it receives input from a user specifying a product to be presented. If the specification is imprecise, it applies configuration rules to determine which view revision of each component to use. For each component of the product, it retrieves an object of the view data class or an object of the view revision data class, and assembles a set of view objects and view revision objects, by using said occurrence references. The result is a structure list of items of the product.

An advantage of the PSM system is that it provides the ability to model a product's structure with a bill of materials, which represents the product beyond simply its geometry.

The PSM system stores data representing imprecise assemblies of a product, but can generate precise assemblies. This permits the creation of a "virtual assembly" from any combination of components or revisions to components. All revisions are interchangeable for use in a virtual assembly.

The ability to assemble more than one view for different versions of the same product permits concurrent development of different aspects of the same product. For example, the engineering and manufacturing departments of the same enterprise can concurrently contribute to product development.

The PSM system can incorporate the business rules of an enterprise to govern product assembly. This makes the PSM system better able to accommodate the needs of a particular user.

The PSM system maintains histories of revisions to individual components of the product. Thus, if a change is made to a product, and later considered incorrect, a user can restore a previous version.

The PSM system may be integrated with a CAD/CAM system to offer geometric models of a product. Bills of materials may be created by the PSM system and augmented with CAD/CAM geometries. Conversely, geometries can be created in the CAD/CAM modeling environment and used to create bills of materials for use by the PSM system.

BRIEF DESCRIPTION OF THE DRAWINGS

FIG. 3 illustrates a display of a portion of a bill of materials (BOM) for a particular product.

FIG. 4 illustrates an expanded display of a bill of materials.

DETAILED DESCRIPTION OF THE INVENTION

Figure 1:
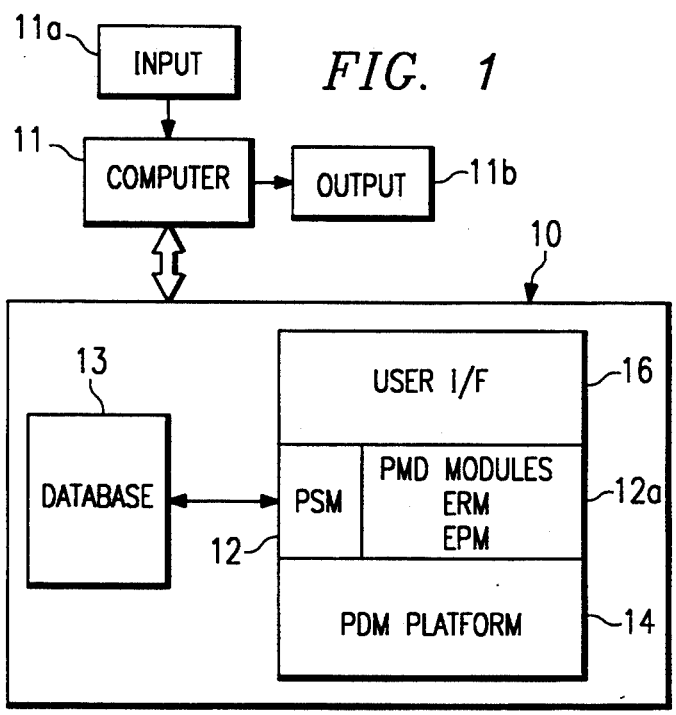
FIG. 1 illustrates a computer-based PDM system that incorporates a PSM system in accordance with the invention.

FIG. 1 illustrates a computer system for implementing a product data manager (PDM) system 10, with which a product structure manager (PSM) 12 is integrated. PSM 12 is a type of PDM module, which deals with maintaining product revision histories and with assembling different configurations of a product from these revisions, in accordance with the invention described herein. As stated in the background section, an example of a PDM system 10, without PSM 12, is the Information Manager, a product of Electronic Data Systems Corporation.

PSM 12 is stored in memory of, and is executed by, a conventional computer system 11, such as a VAX/VMS or a UNIX system. Typically, the computer system is part of a distributed network of workstations having a number of computers 11. In the example of this description, the operating system includes a windows type sub-system, which supports various graphical user interfaces, such as dialog boxes and selection buttons. Computer 11 is in communication with input and output devices, which for purposes of this description are a keyboard, pointing device, and graphics display.

PSM 12 may be integrated with other PDM modules 12a, which implement various PDM tasks. An advantage of implementing PSM 12 as a part of a more comprehensive set of PDM modules 12a is that it can then make use of data from other program modules and deliver data to them. For example, an enterprise process manager (EPM) module might model the process by which products are approved for manufacture, with data from that module being provided to PSM 12 to indicate that a particular configuration of a product has an "approved" status. An enterprise resource manager (ERM) module might model how resources such as materials and employees are allocated.

As explained below, PSM 12 stores a model of at least one product. The computer programming used to implement PSM 12 is based on object-oriented design. Thus, data is associated with classes, which have hierarchies, and relationships. Classes specify what data they store and what operations can be performed on them. Instances of data classes are objects, and are derived by modeling the operations of various application domains. It is representations of these objects that are manipulated by the user interface 16.

The data model stored by PSM 12 is comprised of objects of the data classes, item and item revision, which refer to the data classes, view and view revision. In essence, an item and an item revision represent a component of a product. As will be explained below, the data classes, view and view revision, are attributes of the item and item revision data classes and permit each component to have more than one version.

PDM platform 14 provides a base upon which the rest of the system 10 is built. It has several modules, including a persistent object manager (POM). The POM provides the following services: mapping object representation to relational representation, messaging, and concurrent access control. In general, platform layer 14 isolates PSM 12 from the operating system and other sub-systems of computer 11.

User interface layer 16 is comprised of user application programming built on the underlying architecture. Because PSM 12 is designed for customization via user interface 16, it complies with the programming strategy often referred to as "toolkit" design.

Consistent with the "toolkit" approach, PSM 12 includes a stored set of "generic" functions. The Appendix lists various functions that can be performed on the objects of PSM 12. More specifically, these functions are provided within PSM 12 so that user interface 16 can pass messages to objects.

Figure 2:
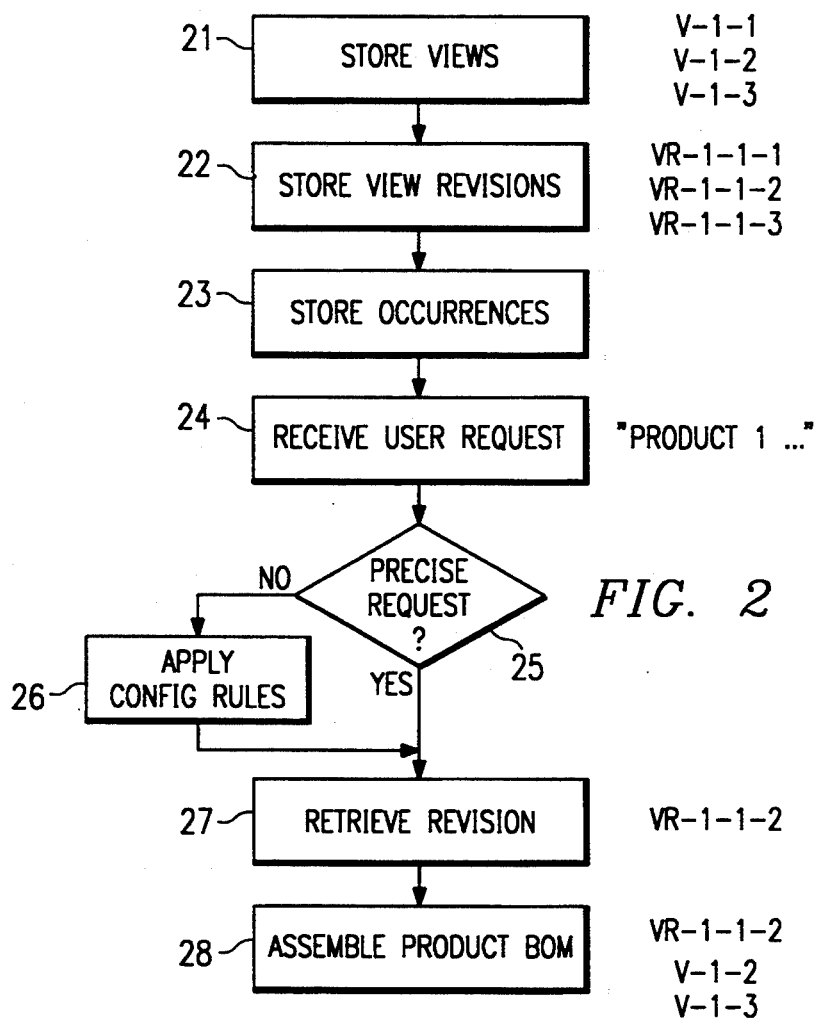
FIG. 2 provides an overview of operation of the PSM.

FIG. 2 provides an overview of operation of PSM 12, together with an example of each step. In essence, PSM 12 is an interactive method of using a computer to model and manage the structure of a product and its revisions. It should be understood that many of the steps involve receiving data input from a user. For purposes of this description, the user is assumed to be a human user, but in some cases the input could be generated by other programming. Thus, the "user" referred to herein could be a human or a computer user.

As indicated in steps 21 and 22, product items and revisions to them are represented and stored as views and view revisions. In the example of FIG. 2, Product 1 (which may also be an item) has three components. Each item is represented by a view, e.g., V-1-1, V-1-2, and V-1-3. One view, V-1-1, has three view revisions, VR-1-1-1, VR-1-1-2, and VR-1-1-3. As explained below in connection with FIG. 4, views and view revisions are stored in terms of identifiers, descriptions, and any attached objects, such as drawings.

A feature of PSM 12 is the ability to store and to operate on data that represents imprecise configurations of the same product. Because any item of the product may have one or more revisions, the stored model is imprecise. As indicated in step 23, PSM 12 permits this imprecise product description by relating view and view revision objects with "occurrence" objects. In general, the occurrence relationship permits a product structure to be stored imprecisely by storing the information that one view uses another, without requiring references to specific view revisions.

As indicated in steps 24 and 25, if a user desires to view a precise product, he may either specify the product precisely or request the product imprecisely with some sort of description of what configuration is desired. An example of the latter might be a request such as, "Show me Product 1, as approved for production".

In step 26, the imprecise request results in the application of configuration rules to select a view revision so that the precise product can be assembled.

Regardless of whether the request is precise or imprecise, in step 27, PSM 12 retrieves the correct view revision. In the example, VR-1-1-2 is either part of a precise specification or has been selected by configuration rules.

In step 28, PSM 12 assembles a precise version of the product. In the example, a precise assembly of Product 1 is assembled from VR-1-1-2, V-1-2, and V-1-3. The product is displayed as a bill of materials, which lists components in terms of item or item revision identifiers. As explained below in connection with FIG. 4, assembly may require PSM 12 to create "appearance" objects, which are paths to views that are context-specific.

The ability of PSM 12 to manage imprecise assemblies provides the user with the ability to view more than one version of the same product. Thus, step 24 could be repeated with a different request, resulting in application of different configuration rules, selection of a different view revision, and a different view of the product.

FIG. 3 is an example of display generated by PSM 12, which presents a portion of a BOM list 30 for a particular product. Each item on a BOM may be a fundamental component, i.e., a piece part, or an intermediate subassembly. A product is also an item. In FIG. 3, a bicycle has a number of items as components. As a better example, a carburetor can be a product in the sense that it can be sold as a unit, but could also be an item if sold as a component of a car.

A user can interact with the BOM 30 by selecting items with a pointing device. The user can control the level of abstraction displayed, such as by expanding or collapsing selected items to show or hide additional data associated with each item. Thus, although the BOM 30 represents a precise product structure, any of the items on the BOM 30 could be expanded to show its associated view or view revisions.

FIG. 4 illustrates a product structure dialog 40, generated by PSM 12 that is an expansion of a BOM 30. The various columns of data available in displays such as those of FIG. 3 and 4 are a matter of user choice and appropriate formatting by PSM 12.

Each item of dialog 40 is shown with whatever additional data is associated with it, i.e., an identifier of any item revisions, an identifier of its view, a view description, an occurrence description, whether it is an appearance, an appearance description, and its status. In general, this additional data may be entered by any user during any stage of product design. Thus, dialog 40 is a data input means as well as a means of presenting a final product structure.

In the example of FIG. 4, an item, a chassis assembly, identified as EX-125, has two items, a front axle assembly and a rear axle assembly, which is a revision of the front axle assembly, identified as AX-025 and AX-025-1, respectively. Each axle assembly has two wheels, and all four wheels are the same item, WH-56-1, a tube-less version. However, in the context of the entire chassis, each wheel can be described in terms of whether it is left or right or front or rear. Thus, with respect to an axle assembly, a wheel has a direct parent-child relationship (an occurrence). In other words, the axle assembly has two occurrences of a wheel. The chassis has two occurrences of an axle assembly. However, with respect to the chassis, each wheel has a context-specific relationship, i.e., left front etc. (an appearance). Appearances permit PSM 12 to determine a path of views and view revisions when a product has multiple components of the same view or view revision and when these components have an indirect relationship to other items.

Figure 5:
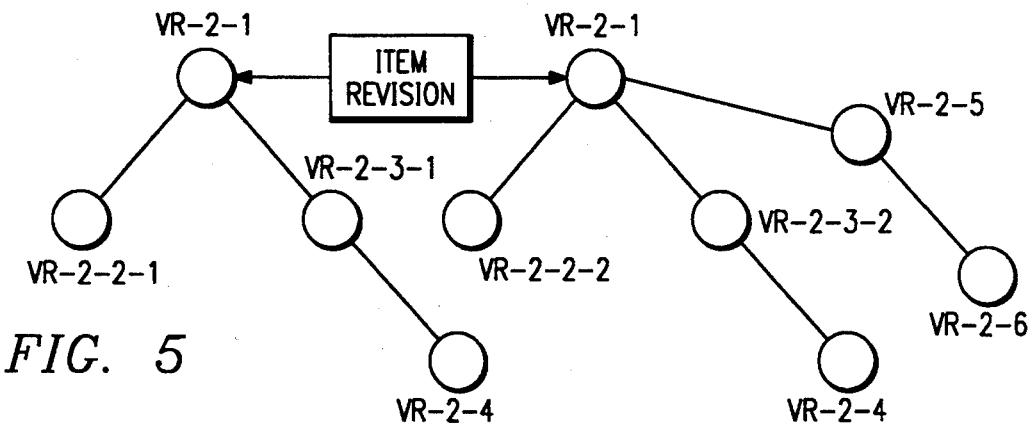
FIG. 5 illustrates how PSM models different views of the same item revision.

FIG. 5 illustrates how PSM 12 stores data entered via dialog 40 to model an imprecise structure and to assemble a precise one. The data classes used for this model are described in connection with FIGS. 6–8.

More specifically, FIG. 5 represents a model of an item revision having more than one view. In this example, a specified item revision has two view revisions, and the items within each view revision are linked by occurrences to other view revisions. Instead of an item revision, the specified item revision could be an item having no revisions. In this sense, items and item revisions are used herein interchangeably.

Using concepts from graph theory, view and view revisions are modeled as nodes, occurrences as arcs, and appearances as paths. Data is attached to each of these objects. Because structure descriptions, i.e., views and view revisions, are used as nodes instead of item and item revisions, different views of the same item or item revision may be attached to that item or item revision. This permits multiple views of an item.

In the example of FIG. 5, the item has two possible structures. One structure has four components, VR-2-1, VR-2-2-1, VR-2-3-1, and VR-2-4. The other structure has six components, VR-2-1, VR-2-2-2, VR-2-3-2, VR-2-4, VR-2-5, and VR-2-6. Several view revisions are common to either structure.

Although FIG. 5 is a graph of two structures in two dimensions, the graph can be conceptualized as a three dimensional representation of imprecise structures. If the user's request is imprecise, the mechanism for determining which view revision of an object should be retrieved is by application of configuration rules. For example, a user may specify that he wants a display of the latest version of "Product A" having the status "Approved for manufacture by X".

Starting with any node on any plane, configuration rules permit PSM 12 to determine a precise assembly, by traveling up and down for different view revisions of an item, and on a plane for occurrences. A view revision of an item will cause a change of planes, and the correct view revision must be located to determine a precise structure.

It is possible that a user might request a product to be displayed that is entirely comprised of precise references. In that case, PSM 12 need only retrieve those objects for assembly without relying on configuration rules.

Figure 6:
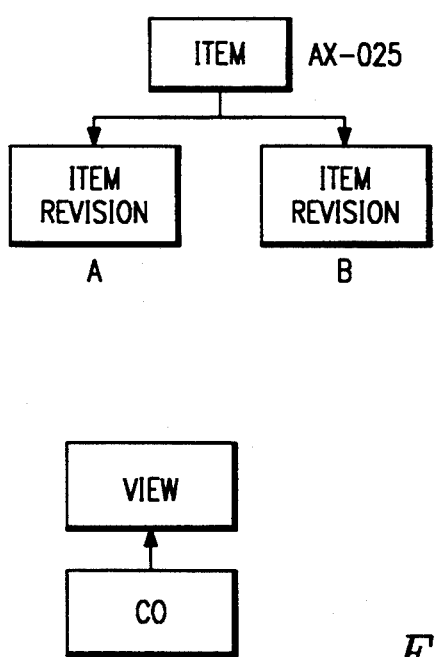
FIG. 6 illustrates the relationships between the data classes, item, and item revision.

FIG. 6 illustrates the relationship between the data classes, item and item revision. The objects of these data classes represent a product's components, thus corresponding to the items of a BOM. An item can be a component of another item. Some objects are attached directly to an item, whereas others are attached to an item revision.

An item revision is distinguishable from other item revisions, but satisfies the same form, fit and function requirements as all other revisions of the same item. Item revisions represent the iterative attempts by design engineers to satisfy the design goals of the product. For example, various revisions may reflect attempts to improve costs or eliminate bugs. In general, an item revision is considered interchangeable with other revisions of the same item. In the example of FIG. 6, item AX-025 has two revisions, AX-025-A and AX-025-B.

An item or an item revision may have attributes, which include its specifications. Some attributes of an item specify it, while others are derived from specification attributes. As in any object-oriented system, attributes may themselves be objects. In fact, most attributes of an item are objects which can themselves be manipulated by application programming.

Figure 7:
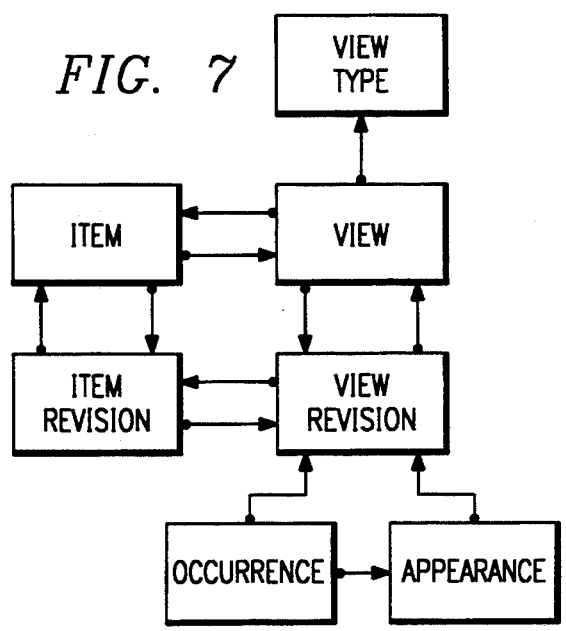
FIG. 7 illustrates the relationship between the data classes, view and view revision.

FIG. 7 illustrates the relationship between the data classes, view and item. A view is an attribute of an item or item revision that is used to describe its structure. Each view knows what item it is a view of. View objects permit a user to specify an item that he desires to be displayed on a bill of materials. A view represents part of an imprecise structure in the sense that any view can have a number of view revisions.

Functions associated with views are set out in the Appendix. Attributes of the view class include an item folder (optional parent), a configuration object (explained below in connection with FIG. 11), and a view type. View type is a data class whose objects represent enterprise specific classifications of views. For example, a view might be designated as a "design" view versus an "assembly" view. This classification can be used to differentiate between multiple views of the same product.

FIG. 7 also illustrates the relationships between the data classes, view and view revision. A view can have one or more view revisions. Views maintain their own revision histories by making each view the "anchor" of its revisions. These view revisions are a data class, viewrevision. In general, a view revision is a precise representation that can be associated with a BOM output. The user can specify a view revision, such that BOM 30 or dialog 40 will display the corresponding item.

FIG. 7 further illustrates the relationship type, occurrence. A view or a view revision may have occurrences that refer to other view objects or view revision objects. In general, an occurrence is a relationship between two views that permits an assembly of components to be modeled. An occurrence is a parent-child relationship, used to store data about a referenced view in the context of the referencing view. View revisions may have occurrences, or reference occurrences or appearances.

The following is an example of how occurrence relationships are modeled:

{view revision}→{view, item}.

When a view revision is entered, PSM 12 creates an item revision. Then, when a product structure is requested, it can be assembled from a user's reference to the associated item. Thus, view revisions are attributes of their item revision. There may be several view revisions per item revision.

The number of occurrences in a chain of items or item revision determines the depth of an assembly of those items. For example, the following item has a depth of four occurrences:

A→B; B→C; C→D; D→E.

The child of an occurrence may be a view (imprecise) or a view revision (precise). When assembly of an item is requested, if a precise specification is made, the associated view revision is retrieved. If an imprecise specification is made, the correct view revision is determined by applying configuration rules and then retrieved.

FIG. 7 further illustrates the relationship of the data class, appearance, to occurrence and view revision data classes. Appearances provide PSM 12 with a means for identifying a context-specific occurrence. An appearance is an attribute of a view revision. Its attributes are a path and a parent.

Figure 8:
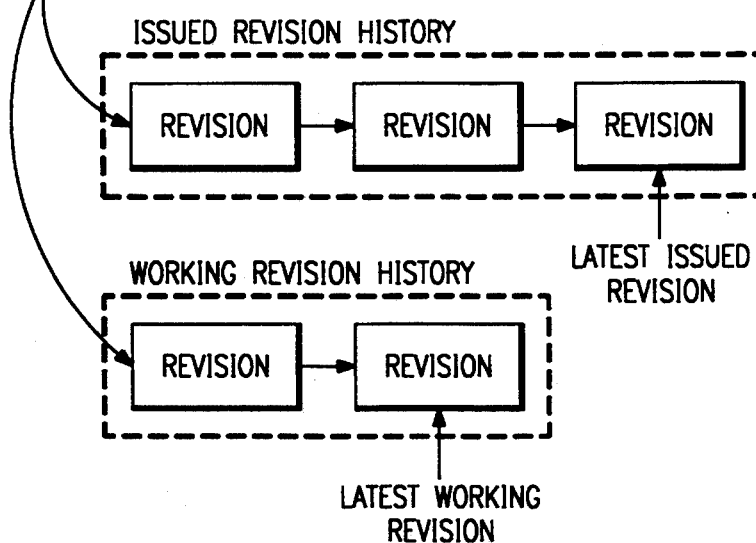
FIG. 8 illustrates how a configuration object (CO) is created to manage relationships between item revisions.

FIG. 8 illustrates how a configuration object (CO) is created when a view of an item is created, to manage the relationship between its revisions. The CO maintains two separate revision histories: one for working revisions and one for issued revisions. Working revisions are those that can be edited. Each time the user saves a working revision, he may choose whether to write over previous revisions. If the previous revision is not overwritten the latest revision is appended to the revision history. Issued revisions are those that may no longer be altered. Each revision history has a CO Root as its anchor. A history appears in only one CO and contains zero or more revisions.

When revisions are added to the CO, they are added to a history depending on whether they are working or issued revisions. Also, if a working revision becomes issued, a duplicate reference to that view revision object can be placed in the issue history object. The duplicate is kept in the working history until a subsequent working version is approved.

FIG. 8 also illustrates how PSM 12 provides access to revisions. Revisions are stored as a "chain" with a pointer always pointing to the next revision in the chain.

Referring again to FIG. 2, run-time operation of PSM 12 can begin with a user's imprecise request for a product. As an example, the user might request "product A as approved by management". As another example, a user might request "the last revision I worked on".

PSM 12 retrieves the correct view revision by applying configuration rules to determine which revision satisfies the user's request. More specifically, PSM 12 applies configuration rules to items to determine which item revision is in effect. Then, PSM 12 via the CO of that item revision, determines which view revision to retrieve.

As stated above in connection with FIG. 1, PSM 12 serves a user interface layer 16, such that the user does not directly interact with PSM 12. However, PSM 12 includes a set of functions that serve interface layer 16. The Appendix sets out examples of such functions, including functions for dealing with configuration rules. From data provided as arguments to these functions, PSM 12 determines which items to consider and which revisions to return.

A precise configuration of a product or item may also be initiated by a request for a specific view revision. The view revision functions set out in the Appendix can be used to operate on specific view revisions.

For assembling a structure, PSM 12 first determines which occurrences of a view or view revision are in effect. Then, it finds the children of the occurrences, and applies configuration rules to decide which of that view's revisions should be loaded. The children of the occurrences of each of these view revisions are then found, a configuration rule applied, and so on, until the depth of the specified item is reached.

A feature of PSM 12 is that revisions may be assigned a status. Status is an object that defines the status type and approval date of a revision. In addition, revisions may be assigned effectivity data. In general, status is associated with approval for manufacture, and effectivity is associated with when to manufacture. For example, a revision might have the status "approved for production". This permits the user to access and work on a previous revision that has a specified status. Effectivity is defined in terms of a revision being effective between specified dates, before a specified date, after a specified date, between specified serial numbers, before a specified serial number, or after a specified serial number. The status object has the attribute status type, which are the particular status designations used by an enterprise, i.e., "released", "approved for manufacture", etc. The status and effectivity designations might result in a configuration which, in general, may not match a precise assembly created by a design engineer.

Another feature of PSM 12 is that users may work on "semi-precise" revisions. A substitute list is a data class, whose objects provide a means to specify a list of item revisions that should be substituted in place of other item revisions as determined by a configuration rule. View revisions may be placed on this list. The Appendix sets out functions for implementing the substitute list.

A "context" object permits the user to open multiple windows. Each window can have its own configuration rules. Functions associated with this object are set out in the Appendix.

A user may request appearances of different view revisions to be equivalent in different assemblies of the same product or in different products. To this end, an "equivalence" data class permits nodes that appear in separate assemblies to be declared equivalent. Functions associated with equivalence objects are set out in the Appendix.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

Module functions initialize(PS)
Name: PS_init_module
Synopsis: extern int PS_init_module(
    void
);
Description: Initializes the PS module, creating an initial current context with default configuration rule, status, effectivity, substitute list and substitution rule.
The user must already have logged into POM. This function must be called before any other PS functions can be called.
Arguments:
none
Failures:
PS_pom_not_started    POM not initialized Name: PS_exit_module
Synopsis: extern int PS_exit_module(
    void
);
Description: Called on exiting the PS module.
Arguments:
none
Failures:
PS_module_not_initialized    PS not initialized PSObject functions defineClientData(PSObject)
Name: PS_define_client_data
Synopsis: extern int PS_define_client_data(
    int     ps_class,    /* <I> */
    char*   at-          /* <I> */
            tr_name,
    tag_t   ref_class,   /* <I> */
    int     property     /* <I> */
);
Description: Adds an extra attribute to a PS class. This extra attribute must be a reference to a POM object. The type of the reference is the specified class. The attribute may have its property set to PS_copyable, in which case this attribute will be copied from one revision of the object to another.
For BOMViewRevision, if property PS_freezable is set, when a BOMViewRevision is issued, the associated client data will be frozen too.
Client data attributes may be added to the classes PS_bom_view,
PS_bom_view_revision,
PS_occurrence, PS_appearance and
PS_view_type. Property PS_copyable is only applicable to
PS_bom_view_revision and
PS_occurrence. Property PS_freezable is only applicable to PS_bom_view_revision.
Arguments:

| | |
|---|---|
| ps_class | token identifying the class of PS object to which this attribute is to be attached |
| attr_name | name of the attribute |
| ref_class | identifier of POM class this attribute references |
| property | see description above |

Failures:
    no such class
    class already has attribute of this name
    attribute name too long
    invalid property askClientData(PSObject)
Name: PS_ask_client_data
Synopsis: extern int PS_ask_client_data(
    tag_t    instance,      /* <I> */
    char*    attr_name,     /* <I> */
    tag_t*   client_data    /* <O> */
);
Description: Returns the client data attributed to the supplied instance for the given attribute name. The client data will be a tag of a POM object.
Note this function is intended for enquiring client data of all PS classes except for occurrence.
As occurrences are referenced using a parent, occurrence pairing a separate interface function PS_ask_occurrence_client_data is provided to enquire client data of an occurrence.
Arguments:

| | |
|---|---|
| instance | tag of an instance |
| attr_name | name of the attribute to be retrieved |
| client_data | tag of a POM object |

Failures:
    no such instance
    no such attribute name
    no client data stored for this attribute setClientData(PSObject)
Name: PS_set_client_data
Synopsis: extern int PS_set_client_data(
    tag_t    instance,      /* <I> */
    char*    attr_name,     /* <I> */
    tag_t*   client_data    /* <I> */
);
Description: Sets the client data attributed to the supplied instance for the given attribute name. The client data must be a tag of a POM objective.
Note this function is intended for setting client data of all PS classes except for occurrence.
As occurrences are referenced using a parent, occurrence pairing a separate interface function PS_ask_occurrence_client_data is provided to set client data of an occurrence.
Arguments:

| | |
|---|---|
| instance | tag of an instance |
| attr_name | name of the attribute to be set |
| client_data | tag of a POM object |

Failures:
    no such instance
    no such attribute name
    no such POM object View Type functions create(ViewType)
Name: PS_create_view_type
Synopsis: extern int PS_Create_view_type(
    char*    type_name,    /* <I> */
    tag_t*   view_type     /* <O> */
);
Description: Adds a new classification of views to the list of BOMView classifications valid for this site.
A classification is a text string e.g. "DESIGN", "Assembly", etc.
Can only be used by the system administrator.
Arguments:

| | |
|---|---|
| type_name | name of the new view type |
| view_type | returns the tag of the new view type |

Failures:

| | |
|---|---|
| PS_duplicate | duplicate type name |
| PS_invalid_string | type name too long |
| PS_invalid_string | null/empty string not allowed user not SA | delete(ViewType)
Name: PS_delete_view_type
Synopsis: extern int PS_delete_view_type(
    tag_t    view_type      /* <I> */
);
Description: Removes the specified view classification from the list of those valid for this site.
Can only be used by the system administrator.
Arguments

| | |
|---|---|
| view_type | classification to be removed from site list |

Failures:    no such view type
            user not SA extent(ViewType)
Name: PS_extent_view_type
Synopsis: extern int PS_extent_view_type(
    int*     n_types,       /* <O> */
    tag_t**  view_types     /* <OF> */
);
Description: Returns the list of BOMView classifications valid for this site.
Arguments:

| | |
|---|---|
| n_types | number of view types on list |
| view_types | returned array of tags of view types |

Failures:

|  |  | find(ViewType) |
|---|---|---|
| Name: | PS_find_view_type | |
| Synopsis: | extern int PS_find_view_type( | |
|  |     char*     type_name, | /* <I> */ |
|  |     tag_t*    view_type | /* <O> */ |
|  | ); | |
| Description: | Returns the tag of the view classification with the given name. | |
|  | Arguments: | |
|  | type_name    name of the view type | |
|  | view_type    returns the tag of the view type | |
|  | Failures:      no such view type | |

|  |  | ask(ViewType) |
|---|---|---|
| Name: | PS_ask_view_type_name | |
| Synopsis: | extern int PS_ask_view_type_name( | |
|  |     tag_t     view_type, | /* <I> */ |
|  |     char**    type_name | /* <OF> */ |
|  | ); | |
| Description: | Returns the text string associated with a view classification. | |
|  | Arguments: | |
|  | view_type    tag of the view type | |
|  | type_name    returns the name of the view type | |
|  | Failures: | |
|  | PS_invalid_tag    no such view type | |
|  | PS instance_not_initialized    instance not initialized | |

BOMView functions

|  |  | create(BOMView) |
|---|---|---|
| Name: | PS_create_bom_view | |
| Synopsis: | extern int PS_create_bom_view( | |
|  |     tag_t     view_type, | /* <I> */ |
|  |     char*     view_name, | /* <I> */ |
|  |     char*     view_desc, | /* <I> */ |
|  |     tag_t     parent_item_folder, | /* <I> */ |
|  |     tag_t     target_folder, | /* <I> */ |
|  |     tag_t*    bom_view | /* <O> */ |
|  | ); | |
| Description: | Creates a new BOMView. No BOMViewRevisions yet. The BOMView may be attached to a specific Item(Folder) or it may be left floating. | |
|  | Arguments: | |
|  | view_type    site_specific identifier for the type of view, e.g. DESIGN, Assembly | |
|  | view_name | |
|  | view_desc | |
|  | parent_item_folder    sets the parent ItemFolder of the BOMView. If null the BOMView has no parent and is left "floating". | |
|  | target_folder    the new BOMView is placed in this folder. If null the BOMView is placed in the parent ItemFolder | |
|  | bom_view    tag of new BOMView | |
|  | Failures: | |
|  | PS_invalid_view_type    invalid view type | |
|  | view name too long | |
|  | description too long | |

|  |  | delete(BOMView) |
|---|---|---|
| Name: | PS_delete_bom_view | |
| Synopsis: | extern int PS_delete_bom_view( | |
|  |     tag_t    bom_view | |
|  | ); | |
| Description: | Deletes a BOMView, and all its BOMViewRevisions, provided none of them is referenced. | |
|  | Arguments: | |
|  | bom_view    tag of the view to be deleted | |
|  | Failures: | |
|  | PS_invalid_bom_view    no such view | |
|  | PS_inst_referenced    a revision of the view is referenced | |

|  |  | listWorkingBomViewRevisions(BOMView) |
|---|---|---|
| Name: | PS_list_working_bvrs | |
| Synopsis: | extern int PS_list_working_bvrs( | |
|  |     tag_t     bom_view, | /* <I> */ |
|  |     int *     n_revisions, | /* <O> */ |
|  |     tag_t**   bvrs | /* <OF> */ |
|  | ); | |
| Description: | Lists all working revisions of the given BOMView. | |
|  | Arguments | |
|  | bom_view    tag of the BOMView | |
|  | n_revisions    number of revisions returned | |
|  | bvrs    array of tags of BOMViewRevisions | |
|  | Failures: | |
|  | PS_invalid_bom_view    no such view | |

|  |  | listIssuedBOMViewRevisions(BOMView) |
|---|---|---|
| Name: | PS_list_issued_bvrs | |
| Synopsis: | extern int PS_list_issued_bvrs( | |
|  |     tag_t     bom_view, | /* <I> */ |
|  |     int*     n_revisions, | /* <O> */ |
|  |     tag_t**   bvrs | /* <OF> */ |
|  | ); | |
| Description: | Lists all issued revisions of the given BOMWiew. | |
|  | Arguments: | |
|  | bom_view    tag of the BOMView | |
|  | n_revisions    number of revisions returned | |
|  | bvrs    array of tags of BOMViewRevisions | |
|  | Failures: | |
|  | PS_invalid_bom_view    no such view | |

|  |  | askConfiguredRevision(BOMView) |
|---|---|---|
| Name: | PS_ask_configured_revision | |
| Synopsis: | extern int PS_ask_configured_revision( | |
|  |     tag_t     bom_view, | /* <I> */ |
|  |     tag_t*    configured_bvr | /* <O> */ |
|  | ); | |
| Description: | Given the tag of a BOMView, this function returns the tag of the revision of this view selected by the current configuration rule. | |
|  | Arguments: | |
|  | bom_view    tag of the BOMView | |
|  | configured_bvr    tag of the BOMViewRevision (a revision of bom_view) selected by the current configuration rule | |
|  | Failures: | |
|  | PS_invalid_bom_view    no such view | |
|  | PS_no_configured_revision    unable to configure revision | |

|  |  | askItemFolder(BOMView) |
|---|---|---|
| Name: | PS_ask_item_folder_of_bom_view | |
| Synopsis: | extern int PS_ask_item_folder_of_bom_view( | |
|  |     tag_t     bom_view, | /* <I> */ |
|  |     tag_t*    item_folder | /* <O> */ |
|  | ); | |
| Description: | Returns the tag of the item folder of which the BOMView is an attribute. | |
|  | Arguments: | |
|  | bom_view    tag of the view | |
|  | item_folder    tag of the item folder of which the view is an attribute | |
|  | Failures: | |
|  | PS_invalid_bom_view    no such view | |

|  |  | setItemFolder(BOMView) |
|---|---|---|
| Name: | PS_set_item_folder_of_bom_view | |
| Synopsis: | extern int PS_set_item_folder_of_bom_view( | |
|  |     tag_t     bom_view, | /* <I> */ |

```
              tag_t      item_folder         /* <I> */
           );
Description: Records the item folder of which the BOMView
           is an attribute.
           Functionality not currently implemented:
           This function may only be used if the item folder
           attribute of this
           BOMView is currently null.
           Arguments:
           bom_view              tag of the view
           item_folder           tag of the item folder of
                                 which the view is to
                                 be an attribute
           Failures:
           PS_invalid_bom_view   no such view
                                         askType(BOMView)
Name:      PS_ask_bom_view_type
Synopsis:  extern int PS_ask_bom_view_type(
              tag_t      bom_view,           /* <I> */
              tag_t*     view_type           /* <OF> */
           );
Description: Enquire the value of the site_specific
           type of a BOMView, e.g.
           DESIGN, ASSEMBLY, BUCKET etc.
           Arguments:
           bom_view              tag of BOMView
           view_type             site_specific identifier
                                 for the type of view,
                                 e.g. DESIGN,
                                 ASSEMBLY,
                                 BUCKET
           Failures:
           PS_in-                no such view
           valid_bom_view
                                         setType(BOMView)
Name:      PS_set_bom_view_type
Synopsis:  extern int PS_set_bom_view_type(
              tag_t      bom_view,           /* <I> */
              tag_t      view_type           /* <I> */
           );
Description: Set the value of the site_specific
           type of a BOMView, e.g. DESIGN,
           ASSEMBLY, BUCKET etc.
           Arguments:
           bom_view              tag of BOMView
           view_type             site-specific identifier
                                 for the type of view,
                                 e.g. DESIGN,
                                 ASSEMBLY,
                                 BUCKET
           Failures:
           PS_invalid_bom_view   no such view
           PS_invalid_view_type  invalid view type
BOMViewRevision functions
                                         create(BOMViewRevision)
Name:      PS_create_bvr
Synopsis:  extern int PS_create_bvr(
              tag_t      bom_view,
              char*      revision_name,
              char*      revision_desc,
              tag_t      parent_irf,
              tag_t      target_folder,
              tag_t*     bvr
           );
Description: Creates an initial working revision
           of this BOMView.
           Arguments:
           bom_view              tag of the view for
                                 which the first
                                 revision is to be
                                 created
           revision_name
           revision_desc
           parent_irf            sets the parent
                                 ItemRevisionFolder
                                 of the
                                 BOMViewRevision.
                                 If null the
                                 BOMViewRevision
                                 has no parent and is
                                 left "floating".
           target_folder         the new
                                 BOMViewRevision
                                 is placed in this
                                 folder.
                                 If null the
                                 BOMViewRevision
                                 is placed in the
                                 parent
                                 ItemRevisionFolder
           bvr                   returns tag of the
                                 revision created
           Failures:
           PS_invalid_bom_view   no such view
                                         revise(BOMViewRevision)
Name:      PS_revise_bvr
Synopsis:  extern int PS_revise_bvr(
              tag_t      source_bvr,         /* <I> */
              tag_t      parent_ivf,         /* <I> */
              tag_t*     new_bvr             /* <O> */
           );
Description: Produces a new working BOMViewRevision
           based on the source
           BOMViewRevision. This new revision is appended
           to the working history of the same BOMView
           as the source BOMViewRevision. The
           source BOMViewRevision may be a working or
           an issued revision.
           Failures:
           Arguments:
           source_bvr            BOMViewRevision to copy
                                 from
           parent_ivf            tag of the item revision folder
                                 of which this
                                 new BOMViewRevision
                                 is to be attribute.
                                 If null the parent ivf of the
                                 source revision is used
           new_bvr               tag of new BOMViewRevision
           Failures:
           PS_invalid_bvr        no such source bvr
                                         copy(BOMViewRevision)
Name:      PS_copy_bvr
Synopsis:  extern int PS_copy_bvr(
              tag_t      source_bvr,         /* <I> */
              tag_t      bom_view,           /* <I> */
              tag_t      parent_ivf,         /* <I> */
              tag_t*     new_bvr             /* <O> */
           );
Description: Produces a new working BOMViewRevision
           based on the source
           BOMViewRevision. This new revision is
           appended to the working
           history of a different BOMView from
           the root BOMView of the
           source BOMViewRevision. The source
           BOMViewRevision may be a
           working or an issued revision.
           Arguments:
           source_bvr            BOMViewRevision
                                 to copy from
           bom_view              target BOMView
           parent_ivf            tag of the item revision
                                 folder of which this
                                 new BOMViewRevision
                                 is to be an
                                 attribute
           new_bvr               tag of new
                                 BOMViewRevision
           Failures:
           PS_invalid_bvr        no such view revision
           PS_in-                no such view
           valid_bom_view
                                         delete(BOMViewRevision)
Name:      PS_delete_bvr
Synopsis:  extern int PS_delete_bvr(
              tag_t      bvr                 /* <I> */
           );
Description: Deletes the specified BOMViewRevision,
           provided it is not referenced.
           If it is issued it may only be deleted by SA.
           Arguments:
```

|  |  |  |
|---|---|---|
| bvr | tag of the revision to be deleted |  |
| Failures: | no such revision |  |
|  | revision is issued (if not SA) |  | issue(BOMViewRevision)

Name: PS_issue_bvr
Synopsis: extern int PS_issue_bvr(
    tag_t    bvr    /* <I> */
);
Description: Freezes the given working revision and appends a reference to it to the issue history.
Arguments:
    bvr    tag of the revision to be issued
Failures:
    PS_invalid_bvr    no such revision
        revision already issued
    PS_inst_modifiable    cannot issue if loaded for modify
    PS_child_not_issued    cannot issue a bvr until its children are issued remove(BOMViewRevision)

Name: PS_remove_bvr
Synopsis: extern int PS_remove_bvr(
    tag_t    bvr    /* <I> */
);
Description: When a BOMViewRevision is issued to the issue history, a reference to that BOMViewRevision remains on the working history from which it came. This reference can be removed using this function.
Arguments:
    bvr    tag of the BOMView-Revision referenced
Failures:
    PS_invalid_bvr    no such revision
    PS_bvr_not_issued    revision is not issued
    PS_not_on_working_history    revision not referenced by working history askBOMView(BOMViewRevision)

Name: PS_ask_bom_view_of_bvr
Synopsis: extern int PS_ask_bom_view_of_bvr(
    tag_t    bvr,    /* <I> */
    tag_t    bom_view    /* <O> */
);
Description: Returns the tag of the BOMView of which this is a revision.
Arguments:
    bvr    tag of a BOMViewRevision
    bom_view    returns tag of the root BOMView
Failures:
    PS_invalid_bvr    no such BOMViewRevision askItemRevisionFolder(BOMViewRevision)

Name: PS_ask_ivf_of_bvr
Synopsis: extern int PS_ask_ivf of bvr(
    tag_t    bvr,    /* <I> */
    tag_t*    ivf    /* <O> */
);
Description: Returns the tag of the item revision folder of which this BOMViewRevision is an attribute.
Arguments:
    bvr    tag of the BOMViewRevision
    ivf    tag of item revision folder of which this BOMViewRevision is an attribute
Failures:
    PS_invalid_bvr    no such BOMViewRevision setItemRevisionFolder(BOMViewRevision)

Name: PS_set_ivf_of_bvr
Synopsis: extern int PS_set_ivf of bvr(
    tag_t    bvr,    /* <I> */
    tag_t    ivf    /* <I> */
);
Description: Sets the tag of the item revision folder of which this BOMViewRevision is an attribute.
This functionality not currently implemented:
Only works if this BOMViewRevision was created with parent item revision folder null when its parent BOMView had parent item folder null.
The parent item folder attribute of the parent BOMView must since have been set, and the item revision folder specified here must be a revision of that item folder.
Arguments:
    bvr    tag of the BOMViewRevision
    ivf    tag of item revision folder of which this BOMViewRevision is to be an attribute
Failures:
    PS_invalid_bvr    no such BOMViewRevision ask_is_issued(BOMViewRevision)

Name: PS_ask_is_issued_bvr
Synopsis: extern int PS_ask_is_issued_bvr(
    tag_t    bvr,    /* <I> */
    logical*    is_issued    /* <O> */
);
Description: Returns true if the BOMViewRevision is issued, i.e. if it is referenced from the issue history.
Arguments:
    bvr    tag of the revision
    is_issued    returns true if the revision is issued
Failures:
    PS_invalid_bvr    no such BOMViewRevision listOccurrences(BOMViewRevision)

Name: PS_list_occurrences_of bvr
Synopsis: extern int PS_list_occurrences_of_bvr(
    tag_t    bvr,    /* <I> */
    int*    n_occurrences,    /* <O> */
    tag_t**    occurrences    /* <OF> */
);
Description: List all the occurrences of the given BOMViewRevision.
Arguments:
    bvr    tag of the parent BOMViewRevision
    n_occurrences    number of occurrences returned
    occurrences    returned array of the tags of the occurrences
Failures:
    PS_invalid_bvr    no such revision listAppearances(BOMViewRevision)

Name: PS_list_appearances_of bvr
Synopsis: extern int PS_list_appearances_of bvr(
    tag_t    bvr,    /* <I> */
    int*    n_appearances,    /* <O>*/
    tag_t**    appearances    /* <OF>*/
);
Description: List all the appearances of the given BOMViewRevision.
Arguments:
    bvr    tag of the parent BOMViewRevision
    n_appearances    number of appearances returned
    appearances    returned array of the tags of the appearances
Failures:
    PS_invalid_bvr    no such revision listStatus(BOMViewRevision)

Name: PS_list_status_of bvr
Synopsis: extern int PS_list_status_of bvr(
    tag_t    bvr,    /* <I> */
    int*    n_statuses,    /* <O> */
    tag_t**    statuses    /* <OF> */
);
Description: Lists all the status objects attributed to the given BOMViewRevision.
Arguments:
    bvr    tag of the BOMViewRevision whose statuses are to be listed
    n_statuses    number of statuses found
    statuses    returns an array of tags of statuses -continued

| | | |
|---|---|---|
| | Failures: | no such BOMViewRevision |

Occurrence functions create(Occurrence)

Name: PS_create_occurrences
Synopsis: extern int PS_create_occurrences(
    tag_t    parent,    /* <I> */
    tag_t    child,    /* <I> */
    int    n_occurrences    /* <I> */
    tag_t**    occurrences    /* <OF> */
);
Description: Creates a number of occurrences linking the specified parent and child BOMViewRevisions.
Arugments:
    parent    tag of the parent BOMViewRevision
    child    tag of the child BOMView
    n_occurrences    number of occurrences to be created
    occurrences    returns an array of the tags of the occurrences created
Failures:
    PS_invalid_bvr    no such parent
    PS_invalid_child    no such child
    PS invalid bvr    cannot link revisions of same view
    PS_invalid_value    n_occurrences < 1 delete(Occurrence)

Name: PS_delete_occurrence
Synopsis: extern int PS_delete_occurrence(
    tag_t    parent,    /* <I> */
    tag_t    occurrence    /* <I> */
);
Description: Deletes the occurrence from its parent. Parent must be loaded for modify.
Arguments:
    parent    tag of the occurrence's parent BOMViewRevision
    occurrence    tag of the occurrence
Failures:
    PS_invalid_bvr    no such parent BOMViewRevision
    PS_invalid_occurrence    no such occurrence in this parent
    PS_inst_locked    parent is locked
Implementation Note: This is actually deleting an instance of occurrence data. If that is the last occurrence data object of that occurrence delete the occurrence too.

ask_child(Occurrence)

Name: PS_ask_occurrence_child
Synopsis: extern int PS_ask_occurrence_child(
    tag_t    parent,    /* <I> */
    tag_t    occurrence,    /* <I> */
    tag_t*    child    /* <O> */
);
Description: Enquires the child BOMViewRevision of an occurrence.
Arguments:
    parent    tag of the occurrence's parent BOMViewRevision
    occurrence    tag of the occurrence
    child    returns tag of child BOMView
Failures:
    PS_invalid_bvr    no such parent BOMViewRevision
    PS_invalid_occurrence    no such occurrence in this parent ask_child(Occurrence)

Name: PS_set_occurrence_child
Synopsis: extern int PS_set_occurrence_child(
    tag_t    parent,    /* <I> */
    tag_t    occurrence,    /* <I> */
    tag_t    child    /* <I> */
);
Description: Sets the child BOMViewRevision of an occurrence. Parent must be loaded for modify. Child must be loaded for read or modify.
Arguments:

-continued parent    tag of the occurrence's parent BOMViewRevision
    occurrence    tag of the occurrence
    child    tag of child BOMView
Failures:
    PS_invalid_child    no such child
    PS_inst_locked    parent locked ask_seq_no(Occurrence)

Name: PS_ask_seq_no
Synopsis: extern int PS_ask_seq_no(
    tag_t    parent,    /* <I> */
    tag_t    occurrence,    /* <I> */
    int*    seq_no    /* <O> */
);
Description: Enquires the sequence number of an occurrence, which determines the ordering of occurrences within their parent BOMViewRevision.
Arguments:
    parent    tag of the occurrence's parent BOMViewRevision
    occurrence    tag of the occurrence
    seq_no    returns sequence number within parent
Failures:
    PS_invalid_bvr    no such parent
    PS_invalid_occurrence    no such occurrence in this parent set_seq_no(Occurrence)

Name: PS_set_seq_no
Synopsis: extern int PS_set_seq_no
    tag_t    parent,    /* <I> */
    tag_t    occurrence,    /* <I> */
    int    seq_no    /* <I> */
);
Description: Sets the sequence number of an occurrence, which determines the ordering of occurrences within their parent BOMViewRevision.
Arguments:
    parent    tag of the occurrence's parent BOMViewRevision
    occurrence    tag of the occurrence
    seq_no    sequence number within parent
Failures:
    PS_invalid_bvr    no such parent
    PS_invalid_occurrence    no such occurrence in this parent ask_transform(Occurrence)

Name: PS_ask_transform
Synopsis: extern int PS_ask_transform(
    tag_t    parent,    /* <I> */
    tag_t    occurrence,    /* <I> */
    double**    transform    /* <OF> */
);
Description: Returns the transform of the given occurrence.
Arguments:
    parent    tag of the occurrence's parent BOMViewRevision
    occurrence    tag of the occurrence
    transform    returns a pointer to some SM allocated space holding a 4 × 4 transform
Failures:
    PS_invalid_bvr    no such parent
    PS_invalid_occurrence    no such occurrence in this parent
    PS_no_transform    no transform set set_transform(Occurrence)

Name: PS_set_transform
Synopsis: extern int PS_set_transform(
    tag_t    parent,    /* <I> */
    tag_t    occurrence,    /* <I> */
    double*    transform    /* <I> */
);
Description: Sets a transform for the given occurrence.
Arguments:

|  |  |  |
|---|---|---|
| | parent | tag of the occurrence's parent BOMViewRevision |
| | occurrence | tag of the occurrence |
| | transform | a pointer to 16 doubles- a 4 × 4 transform with no perspective and unit scale |
| Failures: | | |
| | PS__invalid__bvr | no such parent |
| | PS__invalid__occurrence | no such occurrence in this parent | askClientData(Occurrence)

Name: PS__ask__occurrence__client__data
Synopsis:
```
extern int PS__ask__occurrence__client__data(
    tag__t    parent,          /* <I> */
    tag__t    occurrence,      /* <I> */
    char*     attr__name,      /* <I> */
    tag__t*   client__data     /* <O> */
);
```
Description: Returns the client data attributed to the supplied occurrence for the given attribute name. The client data will be a tag of a POM object.
Arguments:

| | parent | tag of the occurrence's parent BOMViewRevision |
|---|---|---|
| | occurrence | tag of the occurrence |
| | attr__name | name of the attribute to be retrieved |
| | client__data | tag of a POM object |
| Failures: | | no such BOMViewRevision |
| | | no such occurrence in parent BOMViewRevision |
| | | no such attribute name |
| | | no client data stored for this attribute | setClientData(Occurrence)

Name: PS__set__occurrence__client__data
Synopsis:
```
extern int PS__set__occurrence__client data(
    tag__t    parent,          /* <I> */
    tag__t    occurrence,      /* <I> */
    char*     attr__name,      /* <I> */
    tag__t    client__data     /* <I> */
);
```
Description: Sets the client data attributed to the supplied occurrence for the given attribute name. The client data must be a tag of a POM object.
Arguments:

| | parent | tag of the occurrence's parent BOMViewRevision |
|---|---|---|
| | occurrence | tag of the occurrence |
| | attr__name | name of the attribute to be set |
| | client__data | tag of a POM object |
| Failures: | | no such parent BOMViewRevision |
| | | no such occurrence in parent |
| | | no such attribute name |
| | | no such POM object |

Appearance functions create(Appearance)

Name: PS__create__appearance
Synopsis:
```
extern int PS__create__appearance
    tag__t    bvr,             /* <I> */
    int       path__length,    /* <I> */
    tag__t*   path,            /* <I> */
    tag__t*   appearance       /* <O> */
);
```
Description: Creates a new appearance. The appearance contains a path of occurrences stating with an occurrence of the BOMViewRevision which owns the appearance.
Note that the appearance stores a path of BOMViewRevision independent occurrence 'threads', so it is not necessary to qualify the occurrences on the path with parent BVRs.
Note that the parent BOMViewRevision is not itself modified by the addition of appearance data. This allows appearances to be created in the context of frozen issued revisions.
Arguments:

| | bvr | tag of the revision in whose context the appearance is being created |
|---|---|---|
| | path__length | number of occurrences in the path |
| | path | array of tags of occurrences forming a path through the structure below bvr |
| | appearance | returns tag of the newly created appearance |
| Failures: | | no such revision |
| | | revision is not loaded |
| | | invalid path |
| | | appearance of this path already exists | delete(Appearance)

Name: PS__delete__appearance
Synopsis:
```
extern int PS__delete__appearance(
    tag__t    appearance,      /* <I> */
    tag__t    bvr              /* <I> */
);
```
Description: Removes the specified appearance from the context of a given BOMViewRevision. Only if this is the only place that this appearance is referenced will the appearance object itself be deleted. In__that case if this appearance is referenced by any equivalence set then that reference will be removed.
Arguments:

| | appearance | tag of the appearance to be removed from the context of a BOMViewRevision |
|---|---|---|
| | bvr | tag of the BOMViewRevision from whose context the appearance is to be removed |
| Failures: | | no such appearance | askParent(Appearance)

Name: PS__ask__appearance__parent
Synopsis:
```
extern int PS__ask__appearance__parent(
    tag__t    appearance,      /* <I> */
    tag__t*   parent           /* <O> */
);
```
Description: Returns the tag of the BOMViewRevision which 'owns' this appearance.
Arguments:

| | appearance | tag of the appearance |
|---|---|---|
| | parent | returns tag of the parent BOMViewRevision |
| Failures: | | no such appearance | askPath(Appearance)

Name: PS__ask__appearance__path
Synopsis:
```
extern int PS__ask__appearance__path(
    tag__t    appearance,      /* <I> */
    int*      path__length,    /* <O> */
    tag__t**  path             /* <I> */
);
```
Description: Returns the occurrence path of the given appearance.
Arguments:

| | appearance | tag of the appearance |
|---|---|---|
| | path__length | returns number of occurrences in the path |
| | path | returns an array of tags of occurrences forming the path |
| Failures: | | no such appearance |

Equivalence functions create(Equivalence)

Name: PS__create__equivalence
Synopsis:
```
extern int PS__create__equivalence
    tag__t    appearance1,     /* <I> */
    tag__t    appearance2      /* <I> */
);
```
Description: Register the two appearances as equivalent. If appearance2 and appearance3 have already been registered as equivalent, and we now say that appearance1 and appearance2 are equivalent, this means that appearances 1,2 and 3 are all equivalent.
Restriction not presently implemented:
You cannot create an equivalence between two appearances of the same BOMViewRevision.
Arguments:

```
                    appearance1
                    appearance2
            Failures:
            PS_invalid_appearance    no such appearance1/2
            PS_already_equivalent    the two appearances
                                     are already
                                     equivalent
```

```
                                               delete(Equivalence)
Name:         PS_delete_equivalence
Synopsis:     extern int PS_delete_equivalence(
                    tag_t      appearance           /* <I> */
                );
Description:  Remove the specified appearance from
              an equivalence set. This means that this appearance
              is now deemed not to be equivalent to any
              other appearance.
              Arguments:
              appearance              tag of the appearance
              Failures:
              PS_invalid_appear-      no such appearance
              ance
              PS_not_equivalent       appearance not in any
                                      equivalence set
                                                 ask(Equivalent)
Name:         PS_ask_if_equivalent
Synopsis:     extern int PS_ask_if_equivalent(
                    tag_t      appearance1,          /* <I> */
                    tag_t      appearance2,          /* <I> */
                    logical*   equivalent            /* <O> */
                );
Description:  Asks if the two appearances are equivalent.
              Arguments:
              appearance1
              appearance2
              equivalent              returns true if the two
                                      appearances are
                                      equivalent
              Failures:
              PS_invalid_appear-      no such appearance1/2
              ance
                                              ask(Equivalent)
Name:         PS_ask_equivalent_in_bvr
Synopsis:     extern int PS_ask_equivalent_in_bvr(
                    tag_t      appearance,           /* <I> */
                    tag_t      bvr,                  /* <I> */
                    tag_t*     equivalent            /* <O> */
                );
Description:  Returns the appearance of a given
              BOMViewRevision which is equivalent to
              a specified appearance of a different
              BOMViewRevision.
              Arguments:
              appearance
              bvr                     tag of the revision in
                                      which an equivalent is
                                      sought
              equivalent              equivalent appearance
                                      found
              Failures:
              PS_invalid_appearance   no such appearance
              PS_invalid_bvr          no such revision
              PS_not_equivalent       no equivalent found
                                                  list(Equivalents)
Name:         PS_list_equivalents_of_app
Synopsis:     extern int PS_list_equivalents_of_app(
                    tag_t      appearance,           /* <I> */
                    int*       n_equivalents,        /* <O> */
                    tag_t**    equivalents           /* <OF> */
                );
Description:  List all those appearances deemed to be equivalent
              to the given appearance.
              Arguments:
              appearance              tag of the appearance
              n_equivalents           returns number of
                                      equivalents found
              equivalents             returns array of tags
                                      of equivalent
                                                       appearances
            Failures:
            PS_invalid_appearance    no such appearance
                                                 list(Equivalents)
Name:         PS_list_equivalent
Synopsis:     extern int PS_list_equivalent(
                    tag_t      bvr1,                 /* <I> */
                    tag_t      bvr2,                 /* <I> */
                    int*       n_appearances,        /* <O> */
                    tag_t**    appearances           /* <OF> */
                );
Description:  Compares bvr1 and bvr2, returning a list of all
              the appearance of bvr1 which have an
              equivalent in bvr2.
              Restriction not currently implemented.
              The two BOMViewRevisions must NOT be
              revisions of the same BOMView.
              Arguments:
              bvr1
              bvr2
              n_appearances           number of equivalent
                                      appearances found
              appearances             array of tags of appearances of
                                      bvr1 with an equivalent in
                                      bvr2.
              Failures:
              PS_invalid_bvr          no such revision 1/2
                                                list(Equivalents)
Name:         PS_list_not_equivalent
Synopsis:     extern int PS_list_not_equivalent(
                    tag_t      bvr1,                 /* <I> */
                    tag_t      bvr2,                 /* <I> */
                    int*       n_appearances,        /* <O> */
                    tag_t**    appearances           /* <OF> */
                );
Description:  Compares bvr1 and bvr2, returning a list of all the
              appearances of brv1 which DO NOT have an
              equivalent in bvr2.
              Restriction not currently implemented:
              The two BOMViewRevisions must NOT be
              revisions of the same BOMView.
              Arguments:
              bvr1
              bvr2
              n_appearances           number of non-equivalent
                                      appearances found
              appearances             array of tags of appearances
                                      of bvr1 with no
                                      equivalent in bvr2.
              Failures:
              PS_invalid_bvr          no such revision 1/2
Configuration functions
                                                ask(Configuration)
Name:         PS_ask_config_rule
Synopsis:     extern int PS_ask_config_rule(
                    int*       rule                  /* <O> */
                );
Description:  Returns the current configuration rule for
              use in building configurations.
              Arguments:
              rule                    configuration rule,
                                      which may be one
                                      of the following
                                      tokens:
              PS_specific             finds the specified
                                      revision
              PS_latest               finds the latest issued
                                      revision
              PS_latest_status        finds the latest issued
                                      revision with the
                                      currently configured
                                      status
              PS_latest_date_effective finds the latest issued
                                      revision with the
                                      currently configured
                                      status which is
                                      effective for
                                      the specified date
              PS_latest_num_effective finds the latest
                                      issued revision
                                      with the currently
                                      configured status
```

|  |  | which is effective for the specified serial number |
|---|---|---|
|  | PS_substitute | if a revision of the view exists in the substitute list this will be substituted. This rule must be used in conjunction (bitwise OR) with one of the other rules |

Some users may wish to load the major items of their structure by serial number, but select basic components like screws, washers etc. by effectivity dates. Therefore it is possible to OR the two effectivity rules together "PS latest date_effective | P_latest_num_effective" to give the desired functionality. Any item whose range of serial numbers and range of effective dates spans those currently set with the configuration rule will be selectable. In practice, on any one item, one of the effectivity attributes (date or serial number) will have open-ended limits set, so selection will be done on the basis of one effectivity attribute only.

ask(Configuration)

| Name: | PS_ask_config_status |  |
|---|---|---|
| Synopsis: | extern int PS_ask_config_status( |  |
|  | tag_t* status_type | /* <O> */ |
|  | ); |  |
| Description: | Returns the status for use with the configuration rule. The status is of the status types allowed for this site. |  |
| Arguments: |  |  |
| status_type | returns the tag of the status type |  |
| Failures: | no status configured |  | ask(Configuration)

| Name: | PS_ask_config_date_effective |  |
|---|---|---|
| Synopsis: | extern int PS_ask_config_date_effective( |  |
|  | date_t* date | /* <O> */ |
|  | ); |  |
| Description: | Returns the effectivity date associated with the current configuration rule. |  |
| Arguments: |  |  |
| date |  |  |
| Failures: | no effectivity date set |  | ask(Configuration)

| Name: | PS_ask_config_num_effective |  |
|---|---|---|
| Synopsis: | extern int PS_ask_config_num_effective( |  |
|  | int* effective_num | /* <O> */ |
|  | ); |  |
| Description: | Returns the effective serial number used with the current configuration rule. |  |
| Arguments: |  |  |
| effective_num |  |  |
| Failures: | no effective serial number set |  | set(Configuration)

| Name: | PS_set_config_rule |  |
|---|---|---|
| Synopsis: | extern int PS_set_config_rule( |  |
|  | int rule | /* <I> */ |
|  | ); |  |
| Description: | Sets the current configuration rule for use in building configurations. |  |
| Arguments: |  |  |
| rule | configuration rule, which may be taken from the following tokens: |  |
| PS_specific | finds the specified revision |  |
| PS_latest | finds the latest issued revision |  |
| PS_latest_status | finds the latest issued revision with the currently configured status |  |
| PS_latest_date_effective | finds the latest issued revision with the currently configured status which is effective for the specified date |  |
| PS_latest_num_effective | finds the latest issued revision with the currently configured status which is effective for the specified serial number |
| PS_substitute | if a revision of the view exists in the working substitute list this will be substituted. This rule must be used in conjunction (bitwise OR) with one of the other rules |

Some users may wish to load the major items of their structure by serial number, but select basic components like screws, washers etc. by effectivity dates. Therefore it is possible to OR the two effectivity rules together "PS_latest_date_effective | PS_latest_num_effective" to give the desired functionality. Any item whose range of serial numbers and range of effective dates spans those currently set with the configuration rule will be selectable. In practice, on any one item, one of the effectivity attributes (date or serial number) will have open-ended limits set, so selection will be done on the basis of one effectivity attribute only.

set(Configuration)

| Name: | PS_set_config_status |  |
|---|---|---|
| Synopsis: | extern int PS_set_config status( |  |
|  | tag_t status_type | /* <I> */ |
|  | ); |  |
| Description: | Sets the status for use with the configuration rule. The status set is chosen from the status types allowed for this site. |  |
| Arguments: |  |  |
| status_type | tag of the status type to be set |  |
| Failures: | invalid status type |  | set(Configuration)

| Name: | PS_set_config_date_effective |  |
|---|---|---|
| Synopsis: | extern int PS_set_config date_effective( |  |
|  | date_t date | /* <I> */ |
|  | ); |  |
| Description: | Sets the effectivity date associated with the current configuration rule. |  |
| Arguments: |  |  |
| date |  |  |
| Failures: | invalid date |  | set(Configuration)

| Name: | PS_set_config_num_effective |  |
|---|---|---|
| Synopsis: | extern int PS_set_config_num_effective( |  |
|  | int effective_num | /* <I> */ |
|  | ); |  |
| Description: | Sets the effective serial number for use with the current configuration rule. |  |
| Arguments: |  |  |
| effective_num |  |  |
| Failures: |  |  |

Substitute List functions list(SubstituteList)

| Name: | PS_list_substitutes |  |
|---|---|---|
| Synopsis: | extern int PS_list_substitutes( |  |
|  | int* n_substitutes, | /* <O> */ |
|  | tag_t** substitutes | /* <OF> */ |
|  | ); |  |
| Description: | Lists the BOMViewRevisions on the SubstituteList. It is these revisions which may be substituted into configurations if the configuration rule PS_substitute is set. |  |
| Arguments: |  |  |
| n_substitutes | number of BOMViewRevisions on the list |  |
| substitutes | array of tags of BOMViewRevisions |  |

-continued

```
                               on the list
          Failures:
                                             set(SubstituteList)
Name:     PS_set_substitutes
Synopsis: extern int PS_set_substitutes(
               int         n_substitutes,       /* <I> */
               tag_t*      substitutes          /* <I> */
          );
Description: Sets the BOMViewRevisions on the SubstituteList.
          It is these revisions which may be substituted
          into configurations if the configuration rule
          PS_substitute is set.
          If the current substitution rule is
          PS_substitutes_specific
          then the exact revisions supplied are placed
          on the SubstituteList.
          If the current substitution rule is
          PS_substitute_latest the latest revision from the
          same ChangeHistory is put on the substitution
          list in place of each revision on the input list.
          Arguments:
          n_substitutes        number of BOMViewRevisions
                               on the list
          substitutes          array of tags of
                               BOMViewRevisions
                               on the list
          Failures:            invalid tag of
                               BOMViewRevision in
                               substitutes array
                                             ask(SubstitutionRule)
Name:     PS_ask_substitution_rule
Synopsis: extern int PS_ask_substitution_rule(
               int*        substitution_rule    /* <O> */
          );
Description: Returns the substitution rule currently set for
          use when setting the Substitution List.
          Arguments:
          substitution_rule    PS_substitute_specific or
                               PS_substitute_latest
          Failures:
                                             set(SubstitutionRule)
Name:     PS_set_substitution_rule
Synopsis: extern int PS_set_substitution_rule(
               int         substitution_rule    /* <I> */
          );
Description: Sets the substitution rule for use when setting
          the Substitution List.
          Arguments:
          substitution rule    PS_substitute_specific or
                               PS_substitute_latest
          Failures:            no such substitution rule
Context functions
                                             create(Context)
Name:     PS_create_context
Synopsis: extern int PS_create_context(
               tag_t*      context              /* <O> */
          );
Description: Creates a new context, making it the current
          context.
          Its attributes are set to default values,
          with configuration rule PS_latest, no status
          or effectivity, an empty substitute list and
          substitution rule PS_substitute_specific
          Arguments:
          context              returns tag of the new context
          Failures:
                                             copy(Context)
Name:     PS_copy_context
Synopsis: extern int PS_copy_context(
               tag_t       source_context,      /* <I> */
               tag_t*      new_context          /* <O> */
          );
Description: Creates a new context, copying attributes from
          the given source context. The new context
          is made the current context.
          Arguments:
          source_context       tag of an existing context whose
                               attributes are to be copied
                               to the new context
          new_context          tag of the newly created context
          Failures:            no such source context
                                             delete(Context)
```

-continued

```
Name:     PS_delete_context
Synopsis: extern int PS_delete_context(
               tag_t       context              /* <I> */
          );
Description: Deletes the given context.
          The current context cannot be deleted, another
          context must be made current first.
          Arguments:
          context              tag of the context to be deleted
          Failures:            no such context
                               cannot delete current context
                                             extent(Context)
Name:     PS_extent_context
Synopsis: extern int PS_extent_context(
               int*        n_contexts,          /* <O> */
               tag_t**     contexts             /* <OF> */
          );
Description: Returns a list of all contexts configured in this
          PS session.
          Arguments:
          n_contexts           number of contexts found
          contexts             returns array of tags of contexts
                                             askCurrent(Context)
Name:     PS_ask_current_context
Synopsis: extern int PS_ask_current_context(
               tag_t*      current_context      /* <O> */
          );
Description: Returns the tag of the current context.
          Arguments:
          current_context      returns tag of the current
                               context
          Failures:
                                             setCurrent(Context)
Name:     PS_set_current_context
Synopsis: extern int PS_set_current_context(
               tag_t       context              /* <I> */
          );
Description: Makes the given context the current context.
          The configuration rule, status, effectivity,
          substitute list and substitution
          rule of the given context become
          those used in loading configurations.
          Arguments:
          context              tag of the context to be made
                               the current context
          Failures:            no such context
```

What is claimed is:

1. A method of using a computer to store data representing an imprecise structure of a product and to present data representing a precise structure of that product, comprising the steps of:
   storing a description of each component of a product as a view object of a view data class;
   storing a description of each revision to a component of a product as a view revision object of a view revision data class;
   linking view objects and view revision objects of different components with references to occurrence objects of an occurrence data class;
   receiving input from a user precisely specifying a product to be viewed;
   retrieving at least one view object or view revision object for each component of said product, by using said occurrence objects; and
   associating each view object and view revision object with a component of said product to create a bill of materials.

2. The method of claim 1, further comprising the step of linking view revision objects of the same component with references to a view object associated with that component.

3. The method of claim 1, wherein said product has multiple components of the same type, further comprising the step of storing context-specific descriptions of such components as appearance objects.

4. The method of claim 1, further comprising the step of using an object of a configuration object data class to store histories of view revisions.

5. The method of claim 1, further comprising the step of using a configuration rule to determine which view revision object of a component is to be retrieved during said retrieving step.

6. The method of claim 1, wherein said components are represented by item objects of item and item revision data classes, and wherein said view objects said view revision objects are attributes of corresponding item objects.

7. A method of using a computer to store data representing an imprecise structure of a product and to present data representing a precise structure of that product, comprising the steps of:

storing a description of each component of a product as a view object of a view data class;

storing a description of a revision to a component as a view revision object of a view revision data class;

linking view objects and view revision objects of different components with references to occurrence objects of an occurrence data class;

storing a set of configuration rules for determining how a precise version of said product is to be assembled;

receiving input from a user imprecisely specifying a product to be viewed and at least one condition associated with said product;

using at least one of said configuration rules to determine a view revision of a component of said product that satisfies said at least one condition;

retrieving a set of view objects and view revision objects, representing each component of said product, by using said occurrence references; and associating each view object and each view revision object with a component of said product to create a bill of materials.

8. The method of claim 7, further comprising the step of linking view revision objects of the same component with references to a view object associated with that component.

9. The method of claim 7, wherein said step of receiving input is comprised of a receiving data representing a status condition and said step of using said configuration rules determines a view revision having said status.

10. The method of claim 7, wherein said step of receiving input is comprised of receiving data representing an effectivity condition and said step of using said configuration rules determines a view revision having said effectivity.

11. The method of claim 7, wherein said product has multiple components of the same type, further comprising the step of storing context-specific descriptions of such components as appearance objects.

12. The method of claim 7, further comprising the step of using an object of a configuration object data class to store histories of view revisions.

13. The method of claim 7, wherein said components are represented by item objects of item and item revision data classes, and wherein said view objects said view revision objects are attributes of corresponding item objects.

14. The method of claim 7, further comprising the step of displaying said bill of materials, and receiving data from a user to add, modify, or delete data attached to said view objects.

15. A method of using a computer to store data representing an imprecise structure of a product and to present data representing a precise structure of that product, comprising the steps of:

storing a description of each component of a product as a view object of a view data class;

storing a description of each revision to a component as a view revision object of a view revision data class;

linking view objects and view revision objects of different components with references to occurrence objects of an occurrence data class;

receiving input from a user imprecisely specifying a product to be viewed;

retrieving at least one view object or view revision object for each component of said product, by using said occurrence objects; and associating each view object and view revision object with a component of said product to create a bill of materials.

16. The method of claim 15, further comprising the step of linking view revision objects of the same component with references to a view object associated with that component.

17. The method of claim 15, wherein said product has multiple components of the same type, further comprising the step of storing context-specific descriptions of such components as appearance objects.

18. The method of claim 15, further comprising the step of using an object of a configuration object data class to store histories of view revisions.

19. The method of claim 15, wherein said components are represented by item objects of item and item revision data classes, and wherein said view objects said view revision objects are attributes of corresponding item objects.

20. The method of claim 15, wherein said step of receiving further comprises the step of receiving at least one condition associated with said product.

21. The method of claim 15, further comprising the step of storing a set of configuration rules for determining how a precise version of said product is to be assembled.

22. The method of claim 21, further comprising the step of using at least one of said configuration rules to determine which view revision object of a component is to be retrieved during said retrieving step.

23. The method of claim 15, further comprising the step of using a configuration rule to determine which view revision object of a component is to be retrieved during said retrieving step.

* * * * *